(12) United States Patent
Toshioka et al.

(10) Patent No.: US 7,588,698 B2
(45) Date of Patent: Sep. 15, 2009

(54) CIRCUIT CONNECTING ADHESIVE

(75) Inventors: Hideaki Toshioka, Osaka (JP); Masamichi Yamamoto, Osaka (JP); Kazuhiro Kawabata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/578,334

(22) PCT Filed: Dec. 2, 2005

(86) PCT No.: PCT/JP2005/022190

§ 371 (c)(1), (2), (4) Date: Oct. 13, 2006

(87) PCT Pub. No.: WO2006/064678

PCT Pub. Date: Jun. 22, 2006

(65) Prior Publication Data

US 2007/0215838 A1   Sep. 20, 2007

(30) Foreign Application Priority Data

Dec. 16, 2004  (JP) .............................. 2004-363757
Mar. 30, 2005  (JP) .............................. 2005-096886

(51) Int. Cl.
H01B 1/00 (2006.01)
H01B 1/04 (2006.01)
H01B 1/06 (2006.01)
H01B 1/02 (2006.01)
H01B 1/22 (2006.01)

(52) U.S. Cl. ........................ 252/500; 252/502; 252/511; 252/512; 252/513; 252/514

(58) Field of Classification Search .......... 252/500.502, 252/511, 512, 513, 514
See application file for complete search history.

(56) References Cited

U.S. PATENT DOCUMENTS

| | | | |
|---|---|---|---|
| 4,568,592 A * | 2/1986 | Kawaguchi et al. | 428/107 |
| 6,238,597 B1 * | 5/2001 | Yim et al. | 252/512 |
| 6,372,839 B1 * | 4/2002 | Ito et al. | 524/493 |
| 7,235,192 B2 * | 6/2007 | Yeager et al. | 252/500 |
| 2003/0069331 A1 * | 4/2003 | Teiichi et al. | 523/176 |

FOREIGN PATENT DOCUMENTS

| | | |
|---|---|---|
| CN | 1277834 A | 12/2000 |
| EP | 1 628 363 A | 2/2006 |
| JP | 07-216329 | 8/1995 |
| JP | H07-216329 * | 8/1995 |
| JP | 08-176521 | 7/1996 |
| JP | 11-061088 | 3/1999 |
| JP | 2000-204324 | 7/2000 |
| JP | 2000-336324 | 12/2000 |
| JP | 2001-049199 | 2/2001 |
| JP | 2002-173658 | 6/2002 |
| JP | 2002-363443 * | 12/2002 |
| JP | 2004-339520 * | 12/2004 |
| WO | WO 03/000816 A | 1/2003 |
| WO | WO 2005/002002 A1 | 1/2005 |

OTHER PUBLICATIONS

Aerosil 300 product information page (http://birdchem.com/pdf/aerosil-300.pdf).*
Chinese Office Action dated Feb. 27, 2009 w/English Translation, issued in Appln. No. 200580014731.0.
Supplementary European Search Report issued in European Patent Application No. EP 05811653 dated May 7, 2009.

* cited by examiner

*Primary Examiner*—Mark Kopec
*Assistant Examiner*—Jaison P Thomas
(74) *Attorney, Agent, or Firm*—McDermott Will & Emery LLP

(57) ABSTRACT

A circuit coupling adhesive which is superior in heat resistance and moisture resistance is provided. The circuit coupling adhesive of the present invention can be used for purposes where high performing reliability is required, since it exhibits satisfactory electroconductive/insulative performance at connection of electrodes, etc. and the characteristics will not be varied so much even after a long period of use in a high temperature and high humidity environment. The circuit coupling adhesive comprises, as the essential ingredients, an epoxy resin, a latent curing agent, inorganic fillers having an average particle diameter of 500 nm or less, and electroconductive particles. By mix a sufficient amount of inorganic fillers having an average particle diameter of 500 nm or less, the coefficient of thermal expansion can be decreased and the heat resistance and moisture resistance can be improved.

3 Claims, No Drawings

CIRCUIT CONNECTING ADHESIVE

RELATED APPLICATION

This application is a national phase of PCT/JP2005/022190 filed on Dec. 2, 2005, which claims priority from Japanese Application No. 2004-363757 filed Dec. 16, 2004 and Japanese Application No. 2005-096886 filed Mar. 30, 2005, the disclosures of which Applications are incorporated by reference herein. The benefit of the filing and priority dates of the International and Japanese Applications is respectfully requested.

TECHNICAL FIELD

The present invention relates to a circuit coupling adhesive for bonding substrates and electronic parts on which electrodes and circuits are provided, and for electrically connecting them.

BACKGROUND ART

In accordance with the trends of miniaturization and multi-functioning of electronic equipment, the miniaturization of connection terminals in the components is further progressing in recent years. Therefore, various circuit coupling adhesives with which connection of such terminals can easily be done are widely used in the field of electronics mounting. For example, they are used for junction of IC chips and a flexible printed circuit board (FPC), junction of IC chips and a glass substrate on which indium-tin-oxide (ITO) electrode circuits are formed, etc.

The circuit coupling adhesive, which is a film-like or paste-like adhesive, is sandwiched between objects to be coupled, and is heated and pressed so as to bond the objects to be coupled. That is, the resin in the adhesive flows due to the application of heat and pressure such that the gap between the opposing electrodes is sealed and at the same time a part of electro-conductive particles are sandwiched between the opposing electrodes so as to achieve electrical coupling. A circuit coupling adhesive is required to have an insulative property to increase a resistance (insulation resistance) between the adjacent electrodes arranged in a surface direction as well as a conductive property to decrease a resistance (connection resistance) between the opposing electrodes arranged in a thickness direction.

An epoxy-based thermosetting resin is mainly used as an insulative resin composition for forming a circuit coupling adhesive. For example, a composition in which a thermosetting resin such as epoxy resin or phenoxy resin is combined with a curing agent is widely used.

The circuit coupling adhesive is required of high reliability since it is used for coupling of precision equipment such as a liquid crystal display (LCD), etc. Therefore, the endurance in the environment is needed in addition to conductive/insulative properties, and such properties are evaluated, for example, by a high temperature and high humidity test, a heat cycle test, etc. Since the epoxy-based resin composition used for the circuit coupling adhesive contains a hydroxyl group in the molecule and hence has high absorption, there is a case in which a coupling failure occurs in a high temperature and high humidity test. Thus, the moisture resistance thereof is a problem to be solved. Also, there is a case in which the connection resistance at the coupled part increases in a heat cycle test because of stress due to the difference in the coefficient of thermal expansion between a substrate and an adhesive, since the resin composition has a higher coefficient of thermal expansion as compared with the substrate material.

Under such situations, in order to reduce the coefficient of thermal expansion and to improve the moisture resistance, methods for adding inorganic fillers into a resin composition are proposed. The reference patent document 1 discloses an adhesive for coupling circuit members. The disclosed adhesive is characterized in that 5 to 200 weight parts of inorganic filler resin compositions are contained in 100 weight parts of adhesive resin compositions.

The reference patent document 2 discloses an epoxy resin-based sheet-like adhesive composition consisting of epoxy resin, latent curing agent, inorganic fillers and polyethersulfone. In the disclosed adhesive composition, 5-900 weight parts of inorganic fillers are contained in 100 parts of the total amount of the epoxy resin, latent curing agent, and polyethersulfone.

Patent document 1: Japanese Patent Application Publication No. H 11-61088.

Patent document 2: Japanese Patent Application Publication No. 2000-204324.

DISCLOSURE OF THE INVENTION

Problems to be Solved by the Invention

Inorganic fillers used in the past generally have an average particle diameter of about 3 μm, which is large, and also the particle diameters are varied, allowing large-sized particles exceeding 100 μm in particle diameters to remain. Therefore, when such inorganic fillers are mixed in a circuit coupling adhesive, there have been cases in which large-sized particles are bitten between opposing electrodes, thereby causing a coupling failure. Also, there is another problem that, although the amount of the inorganic fillers must be increased in order to reduce the coefficient of thermal expansion and to improve the moisture resistance, the inorganic fillers cannot be combined in an amount necessary for improving moisture resistance since adhesive property may be degraded because of a large amount of the inorganic fillers, thereby causing conduction failure in the coupled part.

An object of the present invention is to solve the above-mentioned problems and to provide a circuit coupling adhesive in which the thermal expansion is restrained under the conditions of high temperature and high humidity, and moreover the moisture resistance can be improved, without compromising basic characteristics such as adhesion, conductive/insulative properties, etc.

Means for Solving the Problems to be Solved

As a result of intensive investigations, the present inventor found that the above problems can be solved by mixing the inorganic fillers having an average particle diameter of 500 nm or less in a resin composition which includes, as essential ingredients thereof, an epoxy resin and a latent curing agent. Thus, the present invention was completed.

The present invention is a circuit coupling adhesive which comprises, as the essential ingredients, (1) epoxy resin, (2) latent curing agent, (3) inorganic fillers having an average particle diameter of 500 nm or less, and (4) electro-conductive particles.

With respect to a circuit coupling adhesive that includes, as essential ingredients thereof, an epoxy resin, a latent curing agent, and electro-conductive particles, it was found that, in order to mix a sufficient amount of inorganic fillers so as to improve the moisture resistance thereof without causing the problem that a degradation of adhesiveness or a coupling failure occurs because of the inorganic fillers being bitten between opposing electrodes at the time of circuit coupling, it is effective to design the average particle diameter of inorganic fillers to be 500 nm or less. This is because the surface area increases as the average particle diameter of inorganic fillers decreases, thereby enabling the enhancement of an interaction with the insulative resin such as an epoxy resin, etc., such that the improvement of moisture resistance and the reduction of coefficient of thermal expansion can be effected with a small mixing amount of the inorganic fillers. Also, if the average particle diameter is equal to or less than 500 nm, the maximum particle diameter can be suppressed to 20 μm or less, whereby a stable connection can be accomplished without causing a coupling failure due to large-sized particles.

Although it is effective to orient electro-conductive particles having a large aspect ratio in the circuit coupling adhesive in order to perform a connection between narrow-pitch electrodes, the orientation of the electro-conductive particles may be inhibited when inorganic fillers are mixed in the adhesive. However, if inorganic fillers having an average particle diameter of 500 nm or less are adopted, the inorganic fillers can be mixed in an amount which is necessary for improving the moisture resistance without causing the problem of inhibiting the orientation.

The larger the mixing amount of the inorganic fillers, the lower the water absorption of the adhesive, which results in improvement in the moisture resistance. However, if the mixing amount of the inorganic fillers is too large, the problem arises that the increase in the amount of inorganic fillers causes the adhesiveness to deteriorate and the connection resistance to increase due to the increase in the amount of inorganic fillers bitten between the electrodes.

Therefore, preferably the mixing amount of the inorganic fillers is 0.5 weight % or more and 30 weight % or less based on the total weight of the epoxy resin. More preferably, the mixing amount of the inorganic fillers is 5 weight % or more and 20 weight % or less with respect to the total weight of the epoxy resin.

The average particle diameter of the inorganic fillers must be designed to be equal to or less than 500 nm. This is because when the average particle diameter of the inorganic fillers is larger, the improvement of the moisture resistance cannot be effected with a small amount of the inorganic fillers as mentioned above. Preferably, the minimum of the average particle diameter is 3 nm or more in view of workability, although it is not limited to it in particular. Moreover, the average particle diameter of the inorganic fillers is preferably 100 nm or less so that the improvement of moisture resistance can be achieved more effectively. Furthermore, it is preferable that the maximum particle diameter of the inorganic fillers be equal to or less than 5 μm. Using such inorganic fillers makes it possible to compatibly attain the improvement of moisture resistance as well as anisotropic electroconductive characteristics without inhibiting the orientation of electro-conductive particles in a circuit coupling adhesive.

As for the materials of inorganic fillers of the present invention, metal oxides, such as silica, alumina, titanium oxide, etc. and hydroxides such as aluminum hydroxide, magnesium hydroxide, calcium hydroxide, etc., composite oxides, and other known oxides can be used. It is preferable to use silica fillers as the inorganic fillers since thereby the coefficient of thermal expansion can be reduced more effectively and the improvement of insulative effect can be achieved.

Moreover, preferably the above-mentioned inorganic fillers are surface-treated with a coupling agent, etc. By applying the surface treatment to the surface of the inorganic fillers with the coupling agent, sticking power between the interfaces of the inorganic fillers and resin compositions such as epoxy resin increases, and expansion due to heat and humidity is suppressed, which results in improvement of connection reliability. Coupling agents that can be used for the surface treatment of the inorganic fillers are silane coupling agent, titanate-based coupling agent, aluminum-based coupling agent, etc. The silane coupling agent is preferable because it does not contain any metal element and the possibility of causing a migration is low.

As for the silane coupling agent, it is preferable to use a silane coupling agent which contains an alkoxyl group. One example of other usable silane coupling agents is a coupling agent which contains chloro group. However, it is not preferable because there is a possibility that chlorine may be separated and may cause migration when the reaction does not progress fully. Examples of alkoxyl groups are a methoxy group, ethoxy group, etc.

Also, of the organic functional groups, such as an epoxy group, an amino group, a mercapto group, a vinyl group, an acryl group, a metacryl group, a cyano group, etc., which may be contained in the silane coupling agent, particularly preferable organic functional groups are epoxy group, amino group and mercapto group. This is because these organic functional groups can cause resin ingredients and inorganic fillers to be more firmly bonded since they can be taken into a intermolecular network as a result of reaction with the epoxy resin or the curing agent in the circuit coupling adhesive.

The electro-conductive particles may be metal particles made of gold, silver, copper, nickel, or alloys thereof, or carbon, etc. Also, the electro-conductive particles may be those made by forming an electroconductive layer on the surface of the nucleus of non-conductive glass, ceramic, plastic, metal oxide, etc. by coating a metal or ITO, etc.

It is preferable to use electro-conductive particles in which a ratio between the diameter and the length (aspect ratio) is equal to or more than 5, because not only can the connection resistance be decreased so as to achieve good electric connection without increasing the mixing amount of the electro-conductive particles, but also higher insulation resistance can be maintained in a surface direction. The aspect ratio of electro-conductive particles is measured directly by a method such as CCD microscope observation or the like. In the case of particles having a non-circular cross section, the aspect ratio is obtained by defining the maximum length of a section perpendicular to the longitudinal direction as the diameter. The electro-conductive particles are not always required to have a straight shape: those having a slightly curved shape or those having a ramification can also be used without problem. In such a case, the aspect ratio is obtained by defining the maximum length of the electro-conductive particles as the length. As for the electro-conductive particles having an aspect ratio of 5 or more, needle-shaped electro-conductive particles available on the marketing can be used. Also, electro-conductive particles which are formed in a needle shape by joining a number of minute metal particles can also be used preferably. More preferably, the aspect ratio is 10-100.

It is preferable to design the length of the electro-conductive particles to be 3 μm or more. This is because it would be difficult to obtain connection reliability in a thickness direction if the length of the electro-conductive particles is less than 3 μm. Also, it is preferable to design the upper limit of the length to be shorter than the distance between the electrodes to be connected. Moreover, the diameter of the electro-conductive particles is preferably about 0.1 μm-about 0.3 μm. By using such electro-conductive particles, the electro-conductive particles can easily be oriented in the magnetic field, and thereby the anisotropic conductivity can be secured.

The above-mentioned minute metal particles are, for example, pure metals having ferromagnetism, such as Fe, Ni, or Co, or an alloy including a metal having ferromagnetism. When the metals having ferromagnetism are used, the orientation of the electroconductive particles can be achieved by their own magnetism, and also the orientation of the electro-conductive particles can be performed using the magnetic field as described later.

It is preferable to design the circuit coupling adhesive to have a film-like shape and to orient the above-mentioned electro-conductive particles having an aspect ratio of 5 or more in a film thickness direction because thereby the anisotropic conductivity is improved further. The term "to orient in a film thickness direction" as used herein means a state in which longitudinal directions of the electro-conductive particles are standing in a direction perpendicular to the film surface. In a case where the electro-conductive particles having ferromagnetism are used as described above, for example, preferably, the electro-conductive particles are dispersed in a solution for resin; the dispersion solution thus obtained is applied onto a substrate, on the surface of which a magnetic field is applied in a direction perpendicular to the surface of the substrate; the electro-conductive particles are oriented; and the orientation is fixed through solidification and hardening by removing the solvent from the surface of film. However, the method of orienting the electro-conductive particles in a film thickness direction is not particularly limited to the above-described method.

The mixing amount of the electro-conductive particles is determined depending on the use, being selected in the range of 0.01-30 volume % based on the whole volume of the circuit coupling adhesive. In order to prevent the degradation of insulation property in a surface direction due to excess electro-conductive particles, 0.01-10 volume % is more preferable.

The epoxy resins to be used in the present invention are, for example, bisphenol-type epoxy resins including bisphenol A, F, S, AD, etc. as a framework, and in addition, a naphthalene-type epoxy resin, a novolac-type epoxy resin, a biphenyl-type epoxy resin, a dicyclopentadiene-type epoxy resin, etc. However, they are not particularly limited to those mentioned above: a phenoxy resin, which is a high-molecular epoxy resin, can also be used.

The molecular weight of the epoxy resins can be appropriately chosen by considering the required performance of the circuit coupling adhesive. The higher the molecular weight, the higher the film formability. Accordingly, the melt viscosity of the resin at the connection temperature can be made higher. This results in an effect such that connection can be accomplished without disturbing the orientation of the electro-conductive particles. On the other hand, when a low molecular-weight epoxy resin is used, the cross link density increases and the heat resistance improves. Furthermore, the adhesion power increases because the cohesive power of the resin increases. Therefore, it is preferable to use both a high molecular weight epoxy resin having a molecular weight of 15000 or more and a low molecular weight epoxy resin having a molecular weight of 2000 or less in combination such that the balance of performance is achieved. The combination ratio of the high molecular-weight epoxy resin and the low molecular-weight epoxy resin can be selected as needed.

The latent curing agents used in the present invention are superior in low-temperature storage reliability such that a curing reaction, which is hardly cured at room temperature, is promptly performed under particular conditions afforded by heating or the like. The latent curing agents are, for example, imidazole system, hydrazide system, boron trifluoride-amine complex, amineimide, polyamine system, tertiary amine, amine system such as alkylurea system, dicyanodiamide, and denatured substance thereof, and these can be used solely or in combination as mixtures of two or more kinds.

Of the above-mentioned latent curing agents, preferably a latent curing agent of imidazole system is used. A known latent curing agent of imidazole system can be used as a latent curing agent of imidazole system, more specifically, an adduct of an imidazole compound with an epoxy resin is used, for example. The available imidazole compounds are, for example, imidazole, 2-methyl imidazole, 2-ethyl imidazole, 2-propyl imidazole, 2-dodecyl imidazole, 2-phenyl imidazole, 2-ethyl-4-methyl imidazole, 4-methyl imidazole.

More preferably, these latent curing agents are formed into microcapsules by coating them with a polymer substance of polyurethane system, polyester system, etc. or inorganic substance such as calcium silicate and a metal film such as nickel, copper, etc. so that the compatibility of long period storage and rapid curing, which are contradictory characteristics, is achieved more sufficiently. Therefore, the latent curing agent in the form of microcapsule-type imidazole system is particularly preferable.

The combination ratio of the epoxy resin and the latent curing agent is preferably 5-40 weight % relative to the total weight of the epoxy resin. When the ratio of the latent curing agent is less than 5 weight %, the curing speed decreases and the hardening may become insufficient. Also, in the case of exceeding 40 weight %, the curing agent which has not reacted tends to remain, which would result in the decrease of heat-resistance and moisture resistance.

In addition to the above-mentioned essential ingredients, the other thermosetting resin, thermoplastic resin, etc. can be added to the circuit coupling adhesive of the present invention within a range not to compromise the effect of the present invention. Also, the circuit coupling adhesive may contain an additive such as an accelerator, inhibitor of polymerization, sensitizer, silane coupling agent, flame retardant, or thixotropic agent.

The circuit coupling adhesives of the present invention can be obtained by mixing the above-mentioned ingredients. For example, liquid circuit coupling adhesives can be produced by dispersing inorganic fillers and electro-conductive particles in solutions which are prepared by dissolving the above-mentioned epoxy resins, latent curing agents, etc. in solvents. Also, film-shaped circuit coupling adhesives are made by applying the dispersion solutions with a roll-coater or the like so as to form thin films and thereafter removing the solvents by drying or other suitable method. The thickness of the film is generally 10 -50 μm, but not particularly limited to it.

Advantageous Effect of the Invention

The present invention provides a circuit coupling adhesive which is superior in heat resistance and moisture resistance. The circuit coupling adhesive of the present invention can be used for purposes where high performing reliability is required, since it exhibits satisfactory electroconductive/insulative performance at connection of electrodes, etc. and the characteristics will not be varied so much even after a long period of use in a high temperature and high humidity environment.

The best embodiments for implementing the invention will be described based on the examples as follows. The examples should not be interpreted to limit the scope of the present invention.

EXAMPLE 1

(Production of Coating Solution)

A solid epoxy resin of bisphenol A-type [EPIKOTE 1256 from Japan Epoxy Resin Corp.] having an average molecular weight of about 48000, a liquid epoxy resin of bisphenol A-type having an average molecular weight of about 400, [EPICLON 850 from Dainippon Ink and Chemicals, Inc.], and a microcapsule-type curing agent of imidazole system [Novacure HX3941 from Asahi Kasei Epoxy Co., Ltd.] as a latent curing agent were used at the ratio of 40/55/20. They were dissolved in cyclohexanone so that a resin composition solution having solid substances by 60% was prepared. To the resin composition solution thus prepared, globular silica particles having average particle diameter of 20 nm were added as inorganic fillers in an amount so as to be 5 weight % based on the total weight of the epoxy resin, and they were mixed with three rolls so as to make a uniform solution. In addition, minute needle-shaped nickel particles having a chain length distribution of 3 μm to 11 μm (concatenated nickel particles having average particle diameter of 200 nm; aspect ratio of 15-55) were added as electro-conductive particles in an amount so as to be 1 volume % based on the total weight of solid substances (resin compositions+inorganic fillers+nickel powder), and they were uniformly dispersed using a centrifugal mixer. Thus, a coating solution for an adhesive was prepared.

(Production of Circuit Coupling Adhesive)

The coating solution prepared as described above was applied with a doctor knife onto PET films which had been processed for release treatment. Thereafter, they were subjected to drying at 60° C. for 30 minutes in a magnetic field having a magnetic flux density of 100 mT so as to be hardened. Thus, film-shaped circuit coupling adhesives having a thickness of 25 μm were prepared.

(Evaluation of Connection Resistance)

IC chips and glass substrates were prepared: on each of the IC chips, 726 gold plating vamps each having a width of 15 μm, a length of 100 μm, and a height of 16 μm were arranged at 15 μm intervals, and on each of the glass substrates, 726 ITO electrodes each having a width of 20 μm were formed at intervals of 10 μm. Each circuit coupling adhesive film prepared as described above was sandwiched between the respective IC chips and circuit boards, and they were subjected to heat bonding by applying a pressure of 20 gf per vamp for 20 seconds while being heated at 200° C. so that they were bonded together, whereby a bonded composite made of the IC and the glass substrate was obtained. Out of the 726 electrodes of the composite, 32 continuing resistance values which were connected through an ITO electrode, a circuit coupling adhesive, and a gold vamp were measured by a four-terminal method, and a connection resistance per electrode was obtained by dividing the value by 32. Such evaluation was repeated 10 times, and the average connection resistance was obtained.

(Heat and Moisture Resistance Test)

The above-mentioned bonded composites made of IC and glass substrate were put in a constant temperature and humidity chamber having a temperature of 60° C. and a humidity of 90%, and they were taken out after 100 hours. Thus, the average of the connection resistances was obtained in the same manner as described above. The results are shown in Table I.

(Measurement of Water Absorption)

With respect to the above circuit coupling adhesives which were fully hardened by a treatment of 200° C. for one hour, the initial stage weight (M1) was were measured, and furthermore their weight (M2) was measured after leaving them at 30° C. and 90% RH for 100 hours. Based on the results of these measurements, the water absorption was determined according to the following formula <<1>>:

$$\text{Water absorption (weight \%)} = [(M2-M1)/M1] \times 100 \qquad <<1>>$$

EXAMPLE 2

Film-shaped circuit coupling adhesives having a thickness of 25 μm were prepared in the same manner as in Example 1 except that the inorganic fillers used were globular silica particles which had an average particle diameter of 20 nm and which were surface-treated with γ-glycidoxypropyltrimethoxysilane [Product name: KBM-403, made from Shin-Etsu Chemical Co., Ltd.], and evaluation of their connection resistance, their heat and humidity resistant test, and measurement of their water absorption were performed. The results are shown in Table I.

EXAMPLE 3

Film-shaped circuit coupling adhesives having a thickness of 25 μm were prepared in the same manner as in Example 1 except that the inorganic fillers used were globular silica particles which had an average particle diameter of 20 nm and which were surface-treated with γ-aminopropyltrimethoxysilane [Product name: KBM-903, made from Shin-Etsu Chemical Co., Ltd.], and evaluation of their connection resistance, their heat and humidity resistant test, and measurement of their water absorption were performed. The results are shown in Table I.

COMPARATIVE EXAMPLE 1

Film-shaped circuit coupling adhesives having a thickness of 25 μm were prepared in the same manner as in Example 1 except that the inorganic fillers used were globular silica particles which had an average particle diameter of 5 μm, and evaluation of their connection resistance, their heat and humidity resistant test, and measurement of their water absorption were performed. The results are shown in Table I.

EXAMPLE 4

Film-shaped circuit coupling adhesives having a thickness of 25 μm were prepared in the same manner as in Example 1 except that the inorganic fillers were mixed in an amount of 32 weight % based on the total weight of epoxy resins, and evaluation of their connection resistance, their heat and humidity resistant test, and measurement of their water absorption were performed. The results are shown in Table I.

EXAMPLE 5

Film-shaped circuit coupling adhesives having a thickness of 25 μm were prepared in the same manner as in Example 1 except that the inorganic fillers were mixed in an amount of 0.1 weight % based on the total weight of epoxy resins, and evaluation of their connection resistance, their heat and humidity resistant test, and measurement of their water absorption were performed. The results are shown in Table I.

TABLE I

| | Water absorption (%) | Connection resistance (Initial stage) | Connection resistance (After 100 hours) | Increase of resistance (%) |
|---|---|---|---|---|
| Example 1 | 1.7 | 1.1Ω | 3.8Ω | 345 |
| Example 2 | 1.5 | 1.0Ω | 2.9Ω | 290 |
| Example 3 | 1.6 | 1.2Ω | 3.2Ω | 267 |
| Comparative Example 1 | 1.8 | 250Ω | 1350Ω | 540 |
| Example 4 | 1.5 | 6.5Ω | 28Ω | 430 |
| Example 5 | 2.2 | 0.9Ω | 8.5Ω | 944 |

The results shown in Table I indicate that when bonding is done using circuit coupling adhesives of the present invention (Examples), the increase in the values of connection resistance is small and excellent heat resistance and moisture resistance can be achieved even in the case where the bonded test samples are left under the environment of high temperature and high humidity for a long time. On the other hand, in Comparative Example 1 in which inorganic fillers having a large average particle diameter were used, the connection resistance at the early stage was high, and moreover the increasing ratio of the resistance value is great. Likewise, in Example 4 where the mixing amount of inorganic fillers was large, the connection resistance at the early stage was high, and the increasing ratio of the resistance value was also great, but it was within an allowable range. As for Example 5 in which the mixing amount of the inorganic fillers was small, the connection resistance at the early stage was lower than the Example 1 to 4, the increasing ratio of the resistance value was high, but it was also within an allowable range. As can be seen clearly from these results, the excellent heat resistance and moisture resistance can be achieved and high reliability can be obtained by using the circuit coupling adhesives of the present invention.

The invention claimed is:

1. A circuit coupling adhesive comprising as essential ingredients:
   (1) an epoxy resin;
   (2) a latent curing agent;
   (3) inorganic fillers having an average particle diameter of less than 100 nm; and
   (4) needle shaped electro-conductive particles,
   wherein the needle-shaped electro-conductive particles are such that the ratio between the diameter and the length (aspect ratio) thereof is equal to or more than 5,
   the inorganic fillers are surface-treated with a silane coupling agent prior to combining the inorganic fillers with the epoxy resin, latent curing agent and needle shaped electro-conductive particles,
   the circuit coupling adhesive is in a shape of film,
   the electro-conductive particles are oriented in a film thickness direction, and
   the mixing amount of the inorganic fillers is 0.5 weight % or more and 30 weight % or less with respect to the total weight of the epoxy resin.

2. A circuit coupling adhesive according to claim 1, wherein the inorganic fillers are made of silica.

3. A circuit coupling adhesive according to claim 1, wherein the coupling agent is a silane coupling agent containing an alkoxyl group.

\* \* \* \* \*